United States Patent
Buckwalter et al.

(10) Patent No.: US 7,505,505 B2
(45) Date of Patent: Mar. 17, 2009

(54) CROSSTALK EQUALIZER

(75) Inventors: James Buckwalter, Pasadena, CA (US);
Seyed Ali Hajimiri, Pasadena, CA (US)

(73) Assignee: California Institute of Technology,
Pasadena, CA (US)

( * ) Notice: Subject to any disclaimer, the term of this patent is extended or adjusted under 35 U.S.C. 154(b) by 835 days.

(21) Appl. No.: 11/071,413

(22) Filed: Mar. 2, 2005

(65) Prior Publication Data

US 2005/0163207 A1 Jul. 28, 2005

Related U.S. Application Data

(63) Continuation-in-part of application No. 11/012,857, filed on Dec. 14, 2004.

(60) Provisional application No. 60/555,648, filed on Mar. 22, 2004, provisional application No. 60/529,871, filed on Dec. 16, 2003.

(51) Int. Cl.
*H04L 7/00* (2006.01)
(52) U.S. Cl. ...................... 372/371; 375/229
(58) Field of Classification Search ........... 375/371, 375/229, 226
See application file for complete search history.

(56) References Cited

U.S. PATENT DOCUMENTS 6,580,770 B2  6/2003  Imanaka et al.

| 6,998,892 B1* | 2/2006 | Nguyen et al. ............ 327/161 |
| 2002/0094043 A1 | 7/2002 | Chu et al. |
| 2003/0165207 A1 | 9/2003 | Noguchi et al. |
| 2003/0184354 A1 | 10/2003 | Higuchi |

OTHER PUBLICATIONS

R. Kollipara, et al. "Design, Modeling and Characterization of High Speed Backplane Interconnects", *DesignCon2003* (2003).
R. Ho, et al. "The Future of Wires", *Proc of the IEEE* (2001) 89(4):490-504.
J. Zerbe, et al. "Equalization and Clock Recovery for a 2.5—10Gbs 2-PAM/4-PAM Backplane Transceiver Cell", *ISSCC Digest* (2003) 80-81.
V. Stojanovic, et al. "Modeling and Analysis of High-Speed Links", *CICC 2003* (2003) 589-594.
H. Nyquist, "Certain Topics in Telegraph Transmission Theory", *AIEE Trans*, (1928) 47:617-644.

(Continued)

*Primary Examiner*—Kevin Y Kim
(74) *Attorney, Agent, or Firm*—Townsend and Townsend and Crew

(57) ABSTRACT

Apparatus and methods for equalizing the jitter on a communication line attributable to uncorrelated data coupled from one or more data lines in close proximity to the communication line. The crosstalk jitter induced by adjacent data lines can be equalized by detecting one or more data or state transitions in the adjacent data lines and comparing the timing of the one or more data or state transitions to the timing of one or more data or state transitions on the communication line. The state transitions can be compared to determine a mode and corresponding level of coupling. A time delay contributed by a variable time delay positioned in series with the communication line can be varied based in part on the level of coupling.

18 Claims, 13 Drawing Sheets

OTHER PUBLICATIONS

Y. Cai, et al. "Jitter Testing for Multi-Gigabit Backplane SerDes-Techniques to Decompose and Combine Various Types of Jitter", *Proc. of IEEE International Test Conference* (2002) 700-709.

M. Shimanouchi, et al. "An Approach to Consistent Jitter Modeling for Various Aspects and Measurement Methods", *Proc. of IEEE International Test Conference* (2001) 848-857.

L. Moura, et al. "Performance Assessment of Signal Jitter on Clock Recovery for High Speed Optical Digital Systems", *IEEE Global Communications Conference* (1994) 2:1175-1179.

C.J. Byrne, et al. "Systematic Jitter in a Chain of Digital Regenerators", *The Bell System Technical Journal* (1963) 42(6):2679-2714.

B.R. Saltzberg, "Timing Recovery for Synchronous Binary Data Transmission", *The Bell System Technical Journal* (1967) 46(3):593-622.

R.D. Gitlin, et al. "Timing Recovery in PAM Systems", *The Bell System Technical Journal* (1971) 50(5):1645-1669.

L.E. Franks, et al. "Statistical Properties of Timing Jitter in a PAM Timing Recovery Scheme", *IEEE Trans. on Communications* (1974) 22(7):913-920.

J.J. O'Reilly, et al. "Influence of Timing Errors on the Performance of Direct-Detection Optical-Fibre Communication Systems", *IEE Proc.* (1985) 132(6):309-313.

M.Z. Win, "On the Power Spectral Density of Digital Pulse Streams Generated by M-ary Cyclostationary Sequences in the Presence of Stationary Timing Jitter", *IEEE Trans. on Communications* (1998) 46(9):1135-1145.

R.A. Gibby, et al. "Some Extensions of Nyquist's Telegraph Theory", *The Bell System Technical Journal* (1965) 44(9):1487-1510.

M. Banu, et al. "A 660Mb/s CMOS Clock Recovery Circuit with Instantaneous Locking for NRZ Data and Burst-Mode Transmission", *ISSCC Dig. Tech Papers* (1993) 102-103, 270.

V.F. Kroupa, "Noise Properties of PLL Systems", *IEEE Trans. on Communications* (1982) 30(10):2244-2252.

E. Roza, "Analysis of Phase-Locked Timing Extraction Circuits for Pulse Code Transmission", *IEEE Trans. on Communications* (1974) 22(9):1236-1249.

K. Kishine, et al. "Loop-Parameter Optimization of a PLL for Low-Jitter 2.5 Gb/s One-Chip Optical Receiver IC with 1:8 Demux", *IEEE J. of Solid-State Circuits* (2002) 37(1):38-50.

M. Mansuri, et al. "Jitter Optimization Based on Phase-Locked Loop Design Parameters", *IEEE J. of Solid-State Circuits* (2002) 37(11) 1375-1382.

\* cited by examiner

500

| Detected Line 1 Data | 00 | 01 | 10 | 11 | 00 | 01 | 10 | 11 | 00 | 01 | 10 | 11 | 00 | 01 | 10 | 11 |
|---|---|---|---|---|---|---|---|---|---|---|---|---|---|---|---|---|
| Detected Line 2 Data | 00 | 00 | 00 | 00 | 01 | 01 | 01 | 01 | 10 | 10 | 10 | 10 | 11 | 11 | 11 | 11 |
| Time Delay Adjustment | 0 | 0 | 0 | 0 | 0 | $-\Delta t$ | $+\Delta t$ | 0 | 0 | $+\Delta t$ | $-\Delta t$ | 0 | 0 | 0 | 0 | 0 |

FIG. 5

CROSSTALK EQUALIZER

CROSS-REFERENCES TO RELATED APPLICATIONS

This application claims the benefit of U.S. Provisional Application No. 60/555,648, filed Mar. 22, 2004, entitled "CROSSTALK EQUALIZER," and is a continuation-in-part of U.S. patent application Ser. No. 11/012,857, filed Dec. 14, 2004, entitled "DETERMINISTIC JITTER EQUALIZER," which claims the benefit of U.S. Provisional Application No. 60/529,871, filed Dec. 16, 2003, entitled "DETERMINISTIC JITTER EQUALIZER," each of which is hereby incorporated herein by reference in its entirety.

This invention was made with government support under ECS-0239343 awarded by The National Science Foundation. The government has certain rights in the invention.

BACKGROUND OF THE INVENTION

The present invention relates to electronic data communications. More particularly, the disclosure relates to timing jitter and compensating for timing jitter in a high speed communication link.

The continual increase in processing speed and complexity provided by processors require tremendous amounts of information to be communicated between devices. The amount of information that is communicated can be increased by increasing the rate at which information is transmitted and by increasing the bus widths that carry the information. Early processors operated on eight bit buses carrying data at rates on the order of 1 MHz. Presently available processors operate on bus widths of 64 bits, each capable of supporting rates on the order of 1 Gigahertz. Further developments in processing capabilites allow even higher data rate to be supported on increasing numbers of data lines. Backplanes and circuit boards are increasingly required to support data rates on the order of 10 GHz. Additionally, high speed data communication is not limited to processor based circuits. Optical data links can be configured to operate at data rates on the order of 10 GHz.

The design of highly complex electronic communication devices is further complicated by the increasing desire to shrink or further miniaturize device sizes. Miniaturization requires that the circuits and devices be packed in highly dense structures.

Exceptional effort is focused on extending the data rate capabilities of economical copper backplanes. While VLSI circuit speed is steadily increasing, the wires between chips and even on-chip are becoming bottlenecks [R. Kollipara, et al., *DesignCon*2003(2003); R. Ho, et al., *Proc. of the IEEE*, vol. 89, no. 4, pp. 490-504 (2001)]. To avoid costly optical interconnects, circuit designers are forced to equalize the channel to increase the data rate, implement alternative channel coding schemes, or simply use more parallel channels J. Zerbe, et al., *ISSCC Digest*, pp. 80-81 (2003); V. Stojanovic and M. Horowitz, *CICC* 2003, pp. 589-594 (2003)]. Ultimately, space and power dissipation limits the number of parallel channels.

The trend in the design of Very Large Scale Integrated (VLSI) circuits and backplanes for computers is to push as many parallel data lines, called interconnects, into close proximity to achieve high physical densities. As parallel wires are positioned closer, electromagnetic energy couples between different interconnects. The energy coupled from one interconnect to another can be referred to as crosstalk. This crosstalk energy is related to the signal on the wire.

Increasing the interconnect density in controlled impedance environments is a problem common to copper backplane and VLS1. Electromagnetic coupling between transmission lines is overwhelming as trace separation reduces. To prevent an aggressive neighboring signal from generating errors in a victim signal, circuit designers match line lengths such that the strongest coupling from the aggressor occurs not in the center of the data eye but during data transitions. While this prevents errors at the sampling point, the aggressor generates jitter on the victim line.

Typically, the signal communicated across an interconnect is a digitally modulated signal. Therefore, the energy coupled from one interconnect to another depends on the symbols transmitted over the interconnects. The coupled energy from one interconnect can disturb the signal on neighboring interconnects. For example, the crosstalk energy can contribute to signal jitter on neighboring interconnects. Ultimately, the coupling can cause errors in data transmitted over the neighboring interconnects.

Crosstalk jitter introduces a sensitivity penalty to the performance of communication networks. The amount of energy coupled by crosstalk is further exacerbated by the use of pre-emphasis on the transmitted signal. Pre-emphasis is typically used to equalize the dispersive effect of the electrical interconnect. In typically pre-emphasis, the transmitted signal is amplified and distorted. Therefore, the transmitted pre-emphasized signal can create more crosstalk than signal transmitted without pre-emphasis.

Signal integrity issues such as timing jitter are at the forefront of high-speed digital design for communication applications. Electronic circuit speeds are overwhelming the legacy channels that traditionally could be treated as ideal.

In high-speed data circuits, the channel behavior is typically compensated appropriately to enable the highest information capacity. Noise considerations dictate the choice of equalization technique. Communications over densely packed high speed interconnects can benefit from techniques for minimizing the sources or effects of crosstalk in a serial communication interconnect.

BRIEF SUMMARY OF THE INVENTION

Apparatus and methods for equalizing the jitter on a communication line attributable to uncorrelated data coupled from one or more data lines in close proximity to the communication line. The crosstalk jitter induced by adjacent data lines can be equalized by detecting one or more data or state transitions in the adjacent data lines and comparing the timing of the one or more data or state transitions to the timing of one or more data or state transitions on the communication line. The state transitions can be compared to determine a mode and level of coupling. A time delay contributed by a variable time delay positioned in series with the communication line can be varied based in part on the level of coupling.

In a binary data configuration, there can be three data conditions. The data transition on the communication line can be in the same direction as the data transition in the adjacent data line, the data transition on the communication line can be opposite to the data transition in the adjacent data line, or a transition can occur in one of the data or adjacent line and no transition can occur in the other line. The delay contributed by a series variable delay module can be varied based in part on the detected data condition.

In a specific embodiment, the invention provides a method of equalizing crosstalk jitter, including determining a level transition in a neighboring signal, determining a state transition in a communication signal, comparing the level transition in the neighboring signal to the state transition in the communication signal, and modifying a timing of the communication signal based at least in part on the comparison.

In another specific embodiment, the invention provides a method of equalizing crosstalk jitter, including determining a logic transition in a neighboring conductive interconnect carrying data signals operating at a rate greater than approximately 6 Giga-symbols per second, determining a logic transition on a communication line carrying data signals operating at a rate substantially equal to the rate of the neighboring conductive interconnect, comparing a phase of the logic transition on the neighboring conductive interconnect to a phase of the logic transition on the communication line, and varying a time delay applied to the data signals of the communication line based at least in part on the comparison.

In another specific embodiment, the invention provides an apparatus configured to equalize crosstalk jitter. The apparatus includes a first transition detector configured to determine a level transition on a neighboring interconnect and provide an output based on the level transition, a second transition detector configured to determine a state transition on a communication line and provide an output based on the state transition, a multiplier coupled to the first transition detector and the second transition detector and configured to generate a control signal based in part on the output from the first transition detector and the output of the second transition detector, and a variable delay module coupled in series with a signal path of the communication line and configured to delay a signal on the communication line based in part on the control signal.

Many benefits are achieved by way of the present invention over conventional techniques. For example, the methods provide for a crosstalk jitter equalizer that is relatively easy to implement in existing data receivers. Compensating for crosstalk jitter in a clock recovery circuit can improve the phase noise of the recovered clock signal. The crosstalk jitter equalizer can ensure that data transitions occur more uniformly relative to a predetermined threshold. A corresponding data eye for crosstalk equalized data can show a greater margin, or eye opening. Depending on the embodiment, one or more of these benefits can be achieved.

Various features and advantages of the present invention can be more fully appreciated with reference to the detailed description and accompanying drawings that follow.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 5 is a table of an example of timing corrections performed by an embodiment of a crosstalk equalizer.

DETAILED DESCRIPTION OF THE INVENTION

The present disclosure describes apparatus and methods of compensating crosstalk jitter. Crosstalk jitter can be compensated by conditioning the received signal on one line with the digital signal on the neighboring interconnects. This crosstalk jitter compensation increases the allowable bit rate in serial communications technology without a substantial fabrication technology improvement.

Bounded uncorrelated jitter is a category of deterministic jitter that can arise from the crosstalk between two interconnects. In a binary digital communication system in which a plurality of interconnects is configured to carry binary data, such as non-return-to-zero (NRZ) data, the NRZ digital signal carried on each line is bounded in amplitude. Thus, the amount of coupled energy on the neighboring interconnect is also bounded. Furthermore, data on distinct interconnects are typically uncorrelated because the interconnects are typically configured to carry digital signals that convey different information.

A receiver in a VLSI architecture, backplane, or some other communication link can be configured to determine the data symbols that have been transmitted on each interconnect. Therefore, to compensate for crosstalk energy, a receiver can be configured to determine on a symbol-by-symbol basis how energy has coupled between the interconnects and cancel out this contribution.

A crosstalk equalizer can be configured to vary a time delay positioned in series with each received signal path based in part on current and previous symbols on each interconnect. The receiver can determine whether a transition has occurred at the current bit on each line under consideration. If a transition is detected on two neighboring interconnects, the equalizer can be configured to change the delay of the signal path on one or both of these interconnects. The signals on both interconnects can be equally affected by the described crosstalk coupling because of symmetry.

Figure 1:
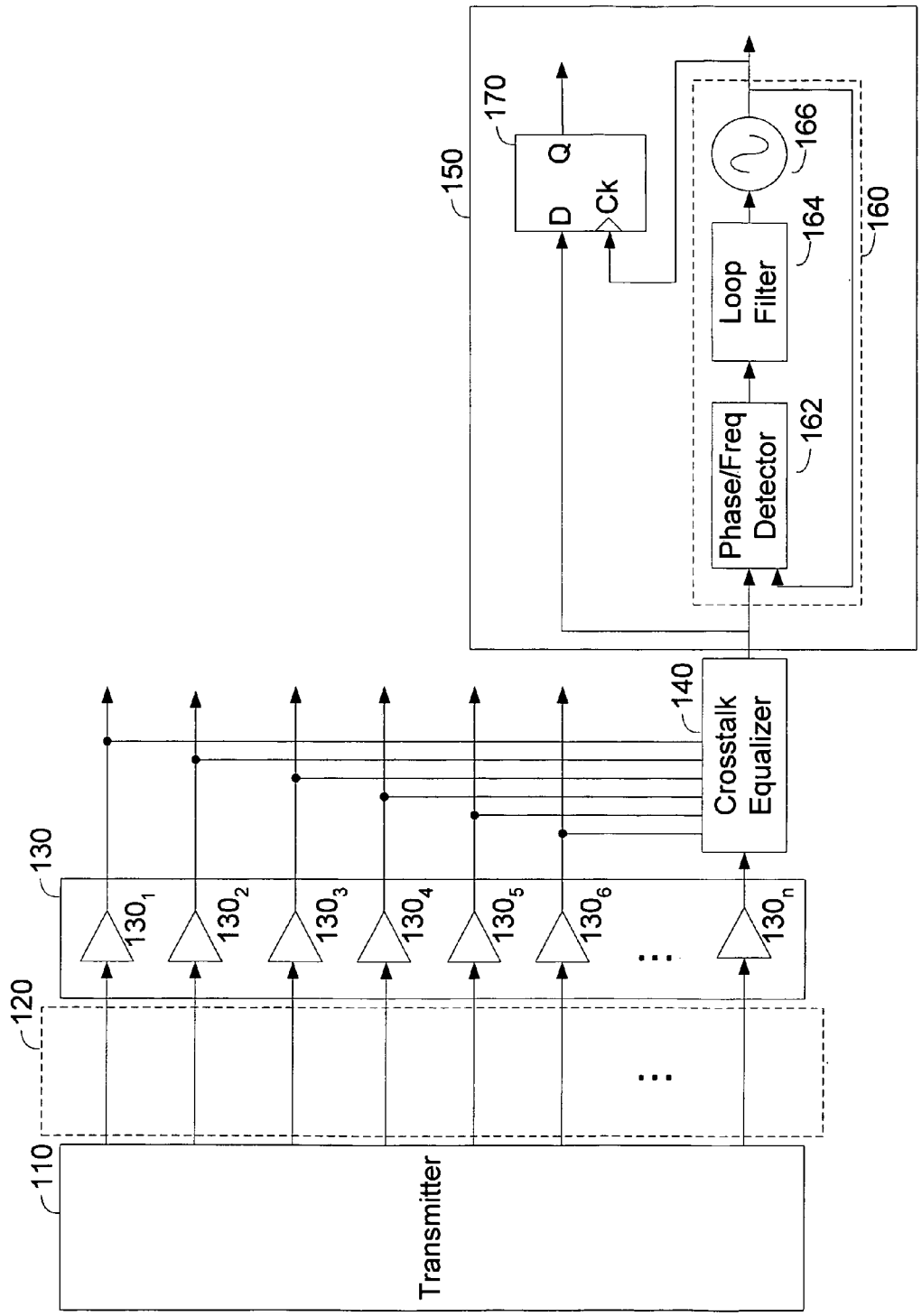
FIG. 1 is a simplified functional block diagram of an embodiment of a serial data communication system incorporating a crosstalk jitter equalizer.

FIG. 1 is a simplified functional block diagram of an embodiment of a serial data communication system 100 incorporating a crosstalk jitter equalizer 150. The serial data communication system 100 can include a transmitter 110 communicating over a plurality of interconnects 120 to a receiver 130. In the embodiment shown in FIG. 1, the transmitter 110 and receiver 130 are configured to generate and receive, respectively, a plurality of serial data signals. However, the plurality of serial data signals need not be generated from a single transmitter 110, but may be generated using a plurality of transmitters, with each transmitter generating one or more serial data signals. The various serial data signals may operate at the same data rate or may be configured to operate at different data rates. Similarly, the different serial data signals can be configured with a similar format or may be configured with different formats. For example, a first serial data signal communicated over a first interconnect can operate at a first data rate and with a first data format, which can be a predetermined M-ary digital modulation. A second serial data signal communicated over a second interconnect can operate at a second data rate, which may be distinct from the first data rate. Additionally, the second serial data signal may be digitally modulated with a modulation that is distinct from the first data format.

The interconnects 120 can be any type of interconnect or combination of interconnects. For example, the interconnects 120 can include interconnects that are wired, wireless, optical, and the like, or some combination of manner for interconnecting the transmitter 130 and receiver 130.

An optical interconnect can include a free space optical channel, an optical fiber, or some other optical link. Similarly, a wired interconnect can include a single ended wireline, twisted pair, coaxial, microstrip, stripline, and the like, or some other conductor based wired link. A typical high-speed wired interconnect can be, for example, an electrically conductive data line on a backplane. A wireless interconnect can include a wireless channel, such as a free space channel, a waveguide, and the like, or some other wireless channel. Additionally, the interconnects 120 can be configured as any combination of optical, wired, and wireless interconnects.

The transmitter 110 can be configured to generate a plurality of serial data streams from corresponding reference serial data stream. The transmitter 110 can couple each of the serial data streams to a corresponding interconnect. Each serial data stream can include a series of symbols, which in the case of binary data can represent a series of bits. The serial data stream can be a high speed data stream configured to have a symbol rate greater than about 6 Giga symbols per second (Gsps). In other embodiments, the serial data stream can be configured to operate at a rate of greater than approximately 7, 8, 9, or 10 Gsps.

The interconnects 120 coupled the serial data streams to the receiver 130. The configuration of the interconnects 120 may allow some level of crosstalk between the various interconnects 120. For example, wired interconnects 120 can couple electromagnetically, and the coupling can be a function of the distance between the conductors.

Typical interconnects 120 include conductive transmission lines manufactured on a backplane, motherboard, or some similar circuit board. The conductive transmission lines can be configured as strip line or microstrip transmission lines. The number of transmission lines and the density of transmission lines can contribute to the crosstalk coupling occurring on each of the transmission lines. For example, high density IC packages can have conductor pitches that are from 0.5-1.0 mm on center. Additionally, the conductors may not be positioned on the periphery of a package, as in a dual in-line or quad package, but may be positioned across the underside of the package, such as in Ball Grid Array (BGA) packages. Thus, in a 64-bit bus line, the 64 separate interconnects may need to be routed to adjacent conductors on an extremely dense package.

Each of the serial data lines in the interconnects 120 can be coupled to a corresponding input of a receiver 130. The inputs of the receiver 130 can be coupled to corresponding amplifiers $131_1$-$131_n$. Each of the amplifiers, for example $131_1$ can include one or more amplification stages, including, but not limited to, a low level amplifier, a low noise amplifier, and a line amplifier.

The outputs from each of the amplifiers $131_1$-$131_n$ can be coupled to appropriate destinations, which are not shown for the sake of simplification. The one or more destinations can include, for example, one or more ICs, modules, or output devices.

The functional block diagram of FIG. 1 shows an output from a particular amplifier $131_n$ coupled to a crosstalk equalizer 140, and from the crosstalk equalizer 140 to a clock and data recovery module 150. Although FIG. 1 only shows a single crosstalk equalizer 140, each of amplifiers $131_1$-$131_n$ corresponding to the plurality of serial data lines, can couple to a corresponding crosstalk equalizer.

The crosstalk equalizer 140 can monitor the uncorrelated received data on each of the interconnects and can compensate for crosstalk jitter in the serial data based on states of the uncorrelated received data and states of the serial data. In FIG. 1, the crosstalk equalizer 140 is coupled to, and configured to monitor the outputs form all of the other interconnects. However, based on the actual implementation, the crosstalk equalizer 140 may compensate for crosstalk jitter by monitoring less than all interconnects. Typically, the crosstalk equalizer 140 can be configured to monitor only those interconnects that are in closest proximity to the interconnect carrying the serial data being compensated. Specific crosstalk equalizer 140 embodiments are shown in subsequent figures.

The output of the crosstalk equalizer 140 can be coupled to a clock and data recovery (CDR) module 150. The CDR module can be configured to recover the clock and compensate for the effects of deterministic jitter.

In a typical serial data communication system 100, the clock signal is recovered from the serial data stream. Jittered data degrade the performance of clock recovery because the changing edge timing of the recovered data stream results in deviations in a phase detector output that is typically used to modulate a voltage controlled oscillator (VCO) 166 used to generate the recovered clock signal.

Jitter in the clock signal can result in a shifting sampling point for the received data stream. If the jittered clock is used in to sample the received data stream in a data recovery module, the result is jittered data, because the clock does not optimally sample a data eye. Jittered data reduces timing margins, thereby closing the data eye and increasing the probability of error.

The input of the CDR module 150 can be coupled to the input of a clock recovery circuit 160 and the D-input of a D flip-flop 170 that can be configured to generate the recovered data using the recovered clock signal.

The clock recovery circuit 160 can be based on a phase locked loop (PLL). The output of the crosstalk equalizer 140 can be coupled to a first input of a phase/frequency detector 162. In one embodiment, the output of the crosstalk equalizer 140 can be coupled to a reference input of the phase/frequency detector 162. The output from a VCO 166 configured to provide the recovered clock output can be coupled to a second input of the phase/frequency detector 162.

The phase frequency/detector 162 can be configured to compare the phase of the two input signals and output a control signal based on the comparison. The output of the phase/frequency detector 162 can be coupled to a loop filter 164, that is typically configured as a low pass filter.

The loop filter 162 defines the bandwidth of the PLL and operates to smooth sudden changes in the control voltage. The output of the loop filter 162 can be coupled to the control input of the VCO 166.

The output of the VCO 166 represents the recovered clock signal. The output of the VCO 166 can be coupled to a clock input of the D flip-flop 170. The recovered clock signal is compensated for crosstalk jitter and is used to clock the D flip-flop 170 to provide a recovered data signal having timing compensated for the effects of crosstalk jitter. The recovered clock signal can also be used to clock the received signals from one or more of the other amplifiers $131_1$-$131_6$, for example, in a serial data communication system 100 in which multiple interconnect signals are synchronized to the same clock signal. An example of such a system includes a parallel processor bus coupled to one or more memory devices.

Figure 2:
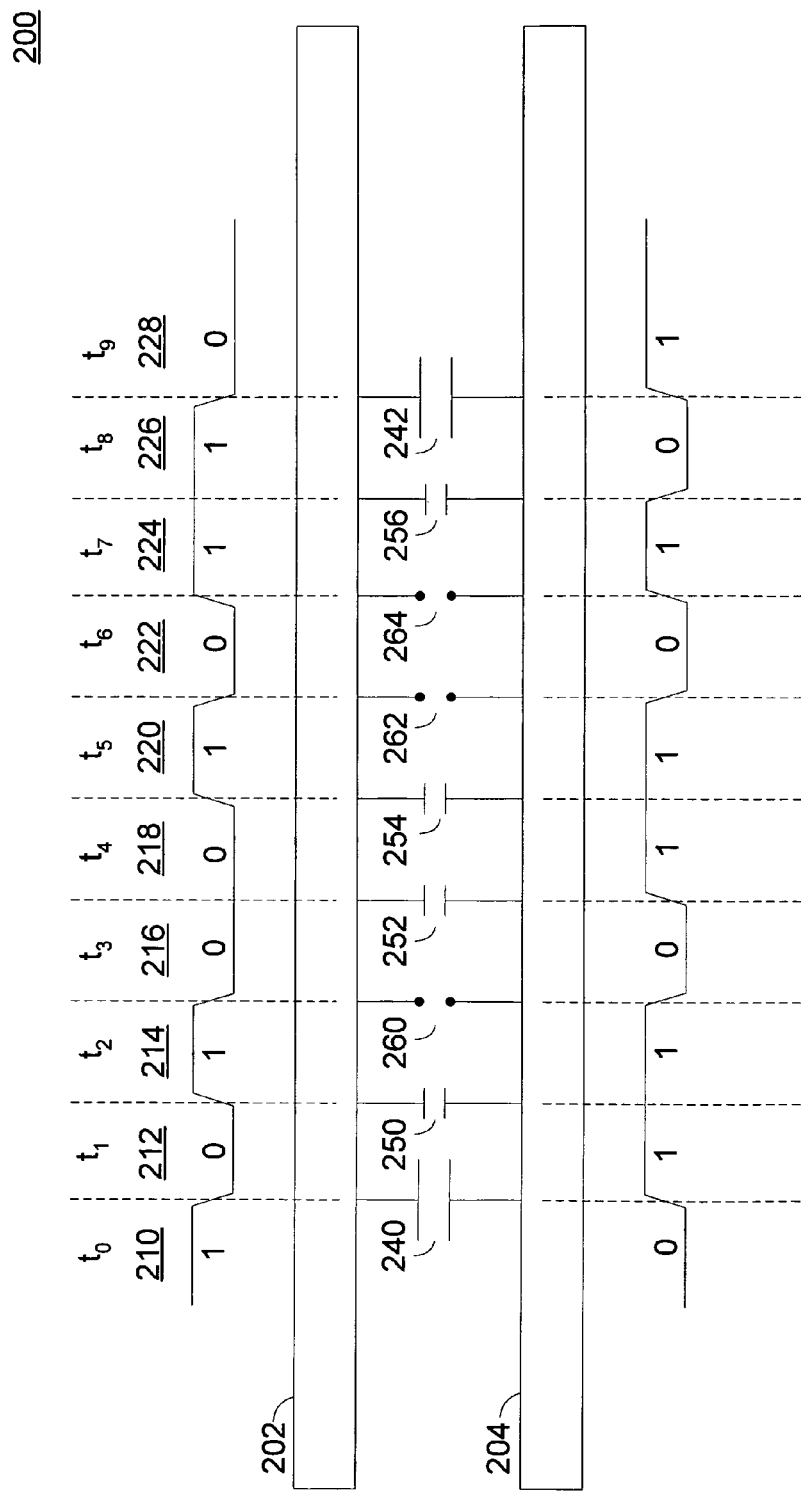
FIG. 2 is a simplified diagram of modes of crosstalk coupling.

FIG. 2 is a simplified timing diagram 200 of modes of crosstalk coupling occurring between two adjacent parallel interconnects 202 and 204 having uncorrelated binary data. The two interconnects 202 and 204 can represent, for example, parallel bus lines positioned on a backplane or motherboard of a high speed digital circuit board.

The serial data on each of the interconnects 202 and 204 is shown in corresponding time windows for ten different instances of time. The serial data is shown as binary NRZ data for the ease of description. However, the interconnects are not limited to binary data, nor are the interconnects 202 and 204 necessarily synchronized. The serial data on the two interconnects 202 and 204 is shown as having the same rate and having data transitions occurring at substantially the same time, because this condition may represent a worst case condition for crosstalk jitter.

The coupling mechanism includes magnetic and electric components and can be considered as inductive and capacitive mechanisms. The dominant component can be determined by the impedance of the line. In analyzing the coupling, capacitance and mutual inductance will cause similar coupling behavior. The basic mechanism for coupling in transmission lines can be modeled as capacitive. Therefore, the signals on the two interconnects 202 and 204 can interact through an electric field between the lines. If the signals have odd mode symmetry there is an electric field that is twice as strong as if one line were grounded. If the signals have an even mode symmetry the electric field on each line opposes the electric field generated by the neighbor creating a null in the electric field. In the case of even symmetry, there is no coupling capacitance experienced by the lines.

When uncorrelated data sequences are transmitted on neighboring interconnects 202 and 204, the symmetry between the lines changes with time. For binary data, there are three possible situations that occur between two interconnects 202 and 204. First, a transition can occurs on one line but not on the other. In this case, the changing signal experiences a nominal amount of coupling, which may be represented by a coupling capacitance. Second, if the signals on each line change in opposite directions, there is odd symmetry. In this case, the coupling capacitance is twice the capacitance of the first case. Finally, if the signals on each line change in the same direction, there is even symmetry. In this case, the coupling capacitance is zero. Therefore, the coupling on the transmission line can be viewed as a time varying capacitance. A corresponding coupling capacitor, for example 240, is shown at each transition to represent the effects that data transitions have on the coupling between the two interconnects 202 and 204.

FIG. 2 shows an initial condition at time to $t_0$ 210 when the data on the first interconnect 202 is high, which can represent a logic 1, and the data on the second interconnect 204 is low, which can represent a logic 0. At the transition to time $t_1$ 212, the data on the first interconnect 202 transitions to a logic 0 and the data on the second interconnect 204 transitions to a logic 1. The anti-phase relationship between the data on the two interconnects 202 and 204 represents odd mode symmetry between the two interconnects 202 and 204. This situation creates the maximum coupling between the two interconnects 202 and 204. This maximum coupling is represented by a large capacitor 240.

At the transition from time $t_1$ 212 to time $t_2$ 214, the data on the first interconnect 202 transitions to a logic 1 and the data on the second interconnect 204 remains at a logic 1. This condition is neither odd nor even mode symmetry, and the coupling between the two interconnects 202 and 204 is represented by a small capacitor 250. Although signal coupling occurs between the two interconnects 202 and 204 when there is a transition on one interconnect 202 but no transition on a second interconnect 204, the condition likely has little effect on crosstalk jitter.

Because no signal transition occurs on the second interconnect 204 in the transition from $t_1$ 212 to $t_2$ 214, little energy is coupled to the first interconnect 202. Similarly, although a data transition occurs on the first interconnect 202 in the transition from $t_1$ 212 to $t_2$ 214, the data on the second interconnect 204 is likely already at the logic level. The energy coupled to the second interconnect 204 may result in overshoot or a runt pulse, depending on the direction of the logic transition on the first interconnection 202 and the logic level on the second interconnection 204.

At the transition from time $t_2$ 214 to $t_3$ 216, the logic levels on both the first and second interconnects 202 and 204 transition to logic 0. The transitions of the two signals are in phase and creates the condition of even mode symmetry. Substantially no energy is coupled between the interconnects 202 and 204. This lack of coupling is represented by the null capacitor 260.

Therefore, as the uncorrelated data on the two interconnects 202 and 204 transition between the two possible logic states, the amount of coupling, represented by a coupling capacitor, changes based on the states and transitions occurring on each of the interconnects. The time varying coupling is illustrated in FIG. 2 for subsequent data transitions.

At the transition from time $t_3$ 216 to time $t_4$ 218, the data on the first interconnect 202 remains at a logic 0 and the data on the second interconnect 204 transitions to a logic 1. The coupling between the two interconnects 202 and 204 is the intermediate coupling represented by a small capacitor 252.

At the transition from time $t_4$ 218 to time $t_5$ 220, the data on the first interconnect 202 transitions to a logic 1 and the data on the second interconnect 204 remains at a logic 1. The coupling between the two interconnects is the intermediate coupling represented by a small capacitor 252.

At the transition from time $t_5$ 220 to $t_6$ 222, the logic levels on both the first and second interconnects 202 and 204 transition to logic 0. Substantially no energy is coupled between the interconnects 202 and 204. This lack of coupling is represented by the null capacitor 262. Similarly, at the transition from time $t_6$ 222 to $t_7$ 224, the logic levels on both the first and second interconnects 202 and 204 transition to logic 1. Substantially no energy is coupled between the interconnects 202 and 204, and the lack of coupling is represented by the null capacitor 264.

At the transition from $t_7$ 224 to $t_8$ 226, the data on the first interconnect 202 remains at a logic 1 and the data on the second interconnect 204 transitions to a logic 0. The coupling between the two interconnects is the intermediate coupling represented by a small capacitor 256.

Finally, at the transition from $t_8$ 226 to $t_9$ 228, the data on the first interconnect 202 transitions to a logic 0 and the data on the second interconnect 204 transitions to a logic 1. The odd symmetry results in the large amount of coupling represented by the large capacitor 242. Although not shown in the figure, the data on the two interconnects 202 and 204 can continue to transition in an uncorrelated manner, resulting in a time varying coupling.

Figure 3:
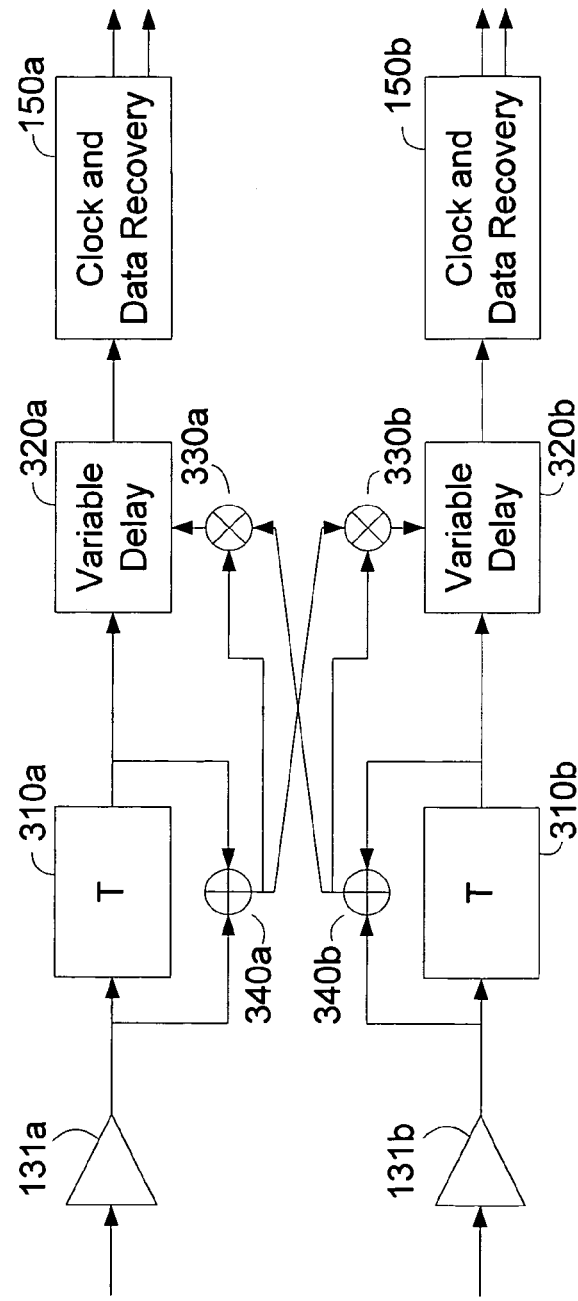
FIG. 3 is a simplified functional block diagram of an embodiment of a crosstalk jitter equalizer.

FIG. 3 is a simplified functional block diagram of an embodiment of receive modules 300 having a crosstalk equalizer configured on each of two separate serial data lines. Each crosstalk equalizer operates to compensate for crosstalk induced jitter attributable to the other data line.

A first amplifier 131a can be configured to receive a first serial data stream coupled from a first interconnect (not shown). The output of the first amplifier 131a is coupled to a first fixed delay module 310a that can be configured to provide a delay that is substantially equal to the period of the first serial data stream. The delayed output from the first fixed delay module 310a can be coupled to first variable delay module 320a that can be configured to provide a delay based in part on a control input value. The output of the first variable delay module 320a can be coupled to the input of a first clock and data recovery module 150a.

The output of the first amplifier 131a is also coupled to an input of a first transition detector 340a. The output of the first fixed delay module 310a is coupled to another input of the first transition detector 340a.

The first transition detector 340a can be configured to at least determine if a transition occurred during the period sampled by the first transition detector 340a. The output of the first transition detector 340a can be coupled to a first multiplier 330a configured to provide a control value to the first variable delay module 320a. The output of the first transition detector 340a can also be coupled of an input of a second multiplier 330b associated with a second serial data stream.

An output from a second transition detector 340b associated with a second serial data stream can be coupled to another input of the first multiplier 330a. The first multiplier 330a can scale the output of the first transition detector 340a with the output from the second transition detector 340b and determine the control value to apply to the first variable delay module 320b to compensate for crosstalk jitter occurring on the first serial data stream.

The second data stream processing is performed nearly identically to the processing of the first serial data stream. A second amplifier 131b is configured to receive the second serial data stream from a second interconnect (not shown).

The output of the second amplifier 131b is coupled to a second fixed delay module 310b that can be configured to provide a delay that is substantially equal to the period of the second serial data stream. The delayed output from the second fixed delay module 310b can be coupled to second variable delay module 320b that can be configured to provide a delay based in part on a control input value. The output of the second variable delay module 320b can be coupled to the input of a first clock and data recovery module 150b.

The output of the second amplifier 131b is also coupled to an input of the second transition detector 340b. The output of the second fixed delay module 310b is coupled to another input of the second transition detector 340b.

The second transition detector 340b can be configured to at least determine if a transition occurred during the period sampled by the second transition detector 340b. The output of the second transition detector 340b can be coupled to a second multiplier 330b configured to provide a control value to the second variable delay module 320b. The output of the second transition detector 340b can also be coupled of an input of the first multiplier 330a associated with first serial data stream and first variable delay module 320a.

An output from the first transition detector 340a can be coupled to another input of the second multiplier 330b. The second multiplier 330b can scale the output of the second transition detector 340b with the output from the first transition detector 340a and determine the control value to apply to the second variable delay module 320b to compensate for crosstalk jitter occurring on the second serial data stream.

Therefore, during processing of the first data stream, state transitions of the first serial data stream are detected and compared against transitions detected from another serial data stream, here the second serial data stream. The delay contributed by the first variable delay module 320a is then varied based on the results from the first and second transition detectors 340a and 340b.

Where the serial data stream is a binary data stream, the transition detector can be a simple as an exclusive Or (XOR) gate. An XOR gate is capable of detecting transitions of binary data for NRZ type data, but is typically unable to determine the direction of transition. More complicated transition detectors can be used to detect the direction of a transition of binary data, or to detect transitions of other data formats.

If the serial data stream is not binary, but is instead M-ary, the design of the transition detector can be further complicated. Moreover, the design of the transition detector may be further complicated if the particular state transition of an M-ary serial data stream is desired. Thus, a transition detector may be configured to detect a state transition, a magnitude associated with the state transition, and a direction of level shift occurring during the state transition. However, such transition detection can typically be performed using a configuration of comparators and combinatorial logic, and thus the details are not presented here.

Additionally, the first and second transition detectors 340a and 340b need not be the same type of transition detectors, and the first and second serial data streams need not be the same type of serial data. For example, the first serial data stream can be binary NRZ data and the second serial data stream can be an M-ary data stream operating at the same or a different data rate. An M-ary serial data stream can be, for example, a 4-PAM serial data stream.

The transition detectors typically detect state transitions occurring in the respective serial data streams. However, the transitions need not correspond to state transitions, but may be any type of level transition occurring in the serial data line. For example, a transition detector can be configured to detect all level transitions on a serial data stream that utilizes a return-to-zero (RZ) data format. In such a binary encoding data format, level transitions do not always coincide with state transitions. However, level transitions occurring on adjacent data lines may only be of concern to a particular data line if the level transitions occur temporally near a state transition on the particular data line. Therefore, a crosstalk jitter equalizer may be configured with a transition detector that is configured to detect all level transitions occurring on an aggressor transmission line, and may be configured with a transition detector that is configured to detect state transitions on the victim line. The crosstalk jitter equalizer can then compensate the timing of the victim line if the level transitions on the aggressor line occur sufficiently near in time to the state transition on the victim line.

Where the transition detector, for example 340a, is configured to provide input to its own crosstalk jitter equalizer as well as a second crosstalk jitter equalizer of another transmission line, the transition detector 340a may be configured to detect all level transitions for the second crosstalk jitter equalizer, but only indicate state transitions for its own crosstalk jitter equalizer.

Figure 4:
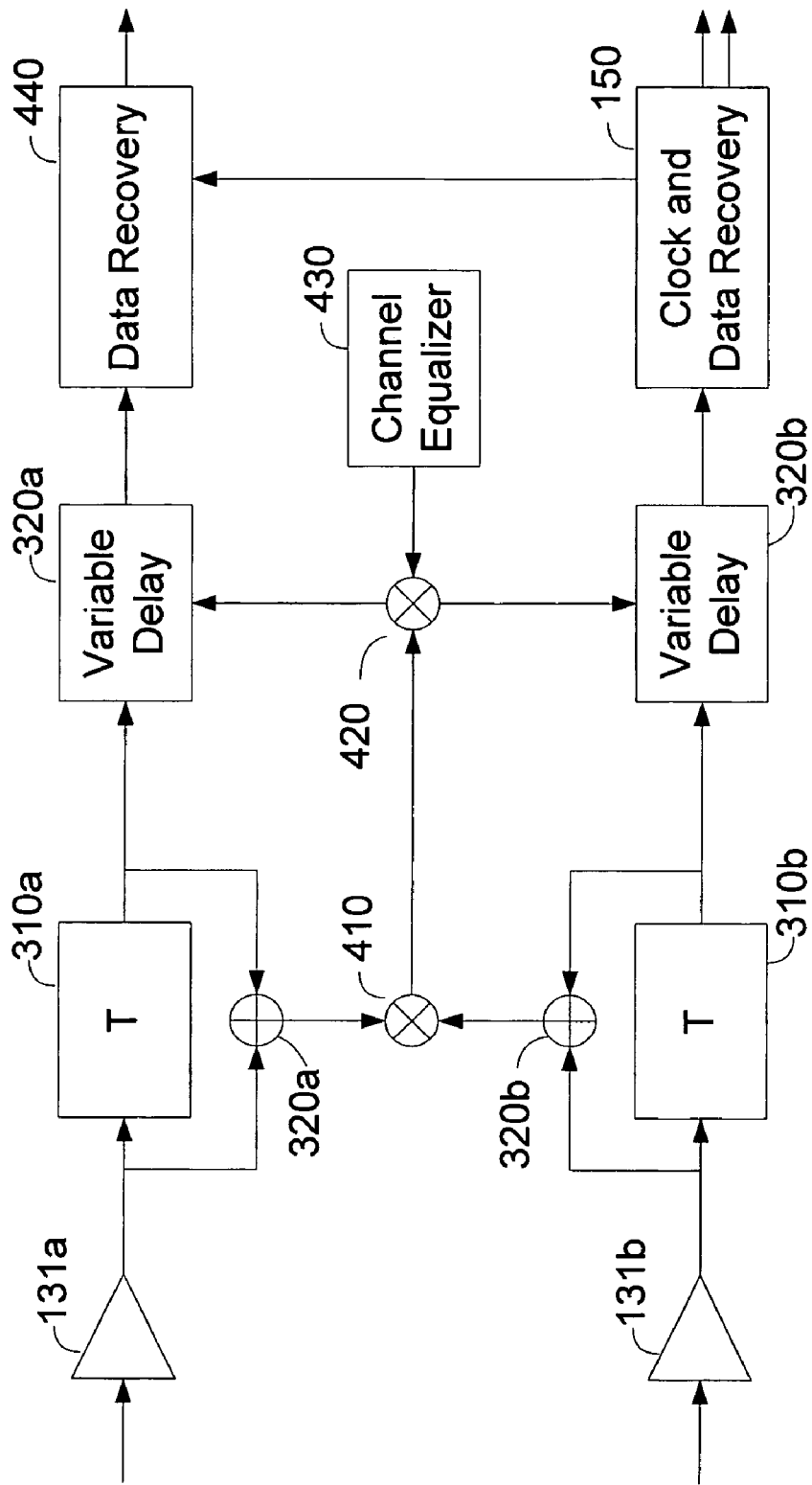
FIG. 4 is a simplified functional block diagram of an embodiment of a crosstalk jitter equalizer.

FIG. 4 is a simplified functional block diagram of an embodiment of a crosstalk jitter equalizer configured to compensate for crosstalk jitter in each of two transmission lines configured to carry binary NRZ data. The two transmission lines can be configured to carry serial communication data such as two of the bits of a parallel bus. The transmission lines can be, for example, adjacent copper conductors on a circuit board such as a backplane. The effects of crosstalk jitter can be relatively similar on both transmission lines, and the control to the variable delay modules 320a and 320b can be common.

The data paths for the two serial data streams are configured as in the system shown in FIG. 3. However, the crosstalk equalization control is simplified and is combined with channel equalization.

A first amplifier 131a receives a first serial data stream and couples it to a first fixed delay module 310a. The output of the first fixed delay module is coupled to an input of a first variable delay module 320b that can be configured to provide a delay having a duration that is substantially equal to the period of the data. The output of the first variable delay module 320a is coupled to an input of a data recovery module 440. The data recovery module 40 can be a simple as a D flip-flop. In the situation where the serial data streams form bits of a parallel bus, clock recovery can be performed on a single data serial data stream and shared among all of the bits of the bus. In the embodiment shown in FIG. 4, clock recovery is performed based on the second serial data stream, and the recovered clock is provided to the data recovery module 440.

A first transition detector 320a, which can be configured to determine a transition and direction of transition, is coupled across the first fixed delay module 310, with one input coupled to the input of the first fixed delay module 310a and a second input coupled to the output of the first fixed delay module 310a. The output of the first transition detector 320b is coupled to an input of a first multiplier 410.

The second serial data path is configured similar to the first data path. A second amplifier 131b is configured to receive a second serial data stream. The output of the second amplifier 131b is coupled to a second fixed delay module 310b that can be configured to provide a delay of substantially one period in duration. The output of the second fixed delay module 310b is coupled to the input of a second variable delay module 320b. The output of the second variable delay module 320b is coupled to an input of a clock and data recovery module 150, which can be the same as the module shown in FIG. 1. The recovered clock signal can be coupled to the data recovery module 440 of the first serial data stream.

Inputs of a second transition detector 320b are coupled to the input and output of the second fixed delay module 320b. The output of the second transition detector 320b is coupled to a second input of the first multiplier 410. The first multiplier 410 is configured to determine the product of the outputs from the first transition detector 320a and the second transition detector 320b.

The output of the first multiplier 410 is coupled to an input of a second multiplier 420. An output from a channel equalizer 430 can be coupled to a second input of the second multiplier 420. The second multiplier 420 can be used to combine the crosstalk jitter control with the channel equalization that is normally performed on serial communication data to compensate for channel effects that can contribute to inter-symbol interference. In other embodiments, the second multiplier 420 and channel equalizer 430 may be omitted. In yet other embodiments, channel equalization may be performed individually on each serial data path.

The output of the second multiplier 420 can be coupled to control inputs of both the first variable delay module 320a and the second variable delay module 320b. The first and second variable delay modules 320a and 320b can be configured to vary a delay duration in response to the control input signal.

In one embodiment, each of the first and second variable delay module 320a and 320b can be configured to provide a nominal delay and can be configured to increase or decrease the delay based on the detected data transitions. If the first and second serial data streams are formatted similarly, the crosstalk jitter induced on each of the data lines can be symmetrical and a single control output can be used to control the variable delay modules 320a and 320b.

FIG. 5 is a map 500 of the variations in the delay provided by a variable delay module in response to detected transitions on binary data interconnects. For example, one or both of the variable delay modules 320a and 320b of the receiver of FIG. 4 can be configured to provide delay according to the map 500.

As can be seen from the map 500, the time delay is not adjusted for any condition where the data on one or the other transmission line does not transition from one state to another. However, in the even symmetry case where the data transition on the first data line is in phase with the data transition on the second data line, the delay can be reduced by an incremental amount from nominal. Conversely, in the odd symmetry case, where the data transition on the first data line is out of phase with the data transition on the second data line, the delay can be increased by an incremental delay amount over a nominal delay.

The incremental time decrease and the incremental time increase can be the same predetermined time increment that can be determined based on the amount of coupling between the two transmission lines. In other embodiments, the incremental time decrease can be distinct from the incremental time increase.

Figure 6:
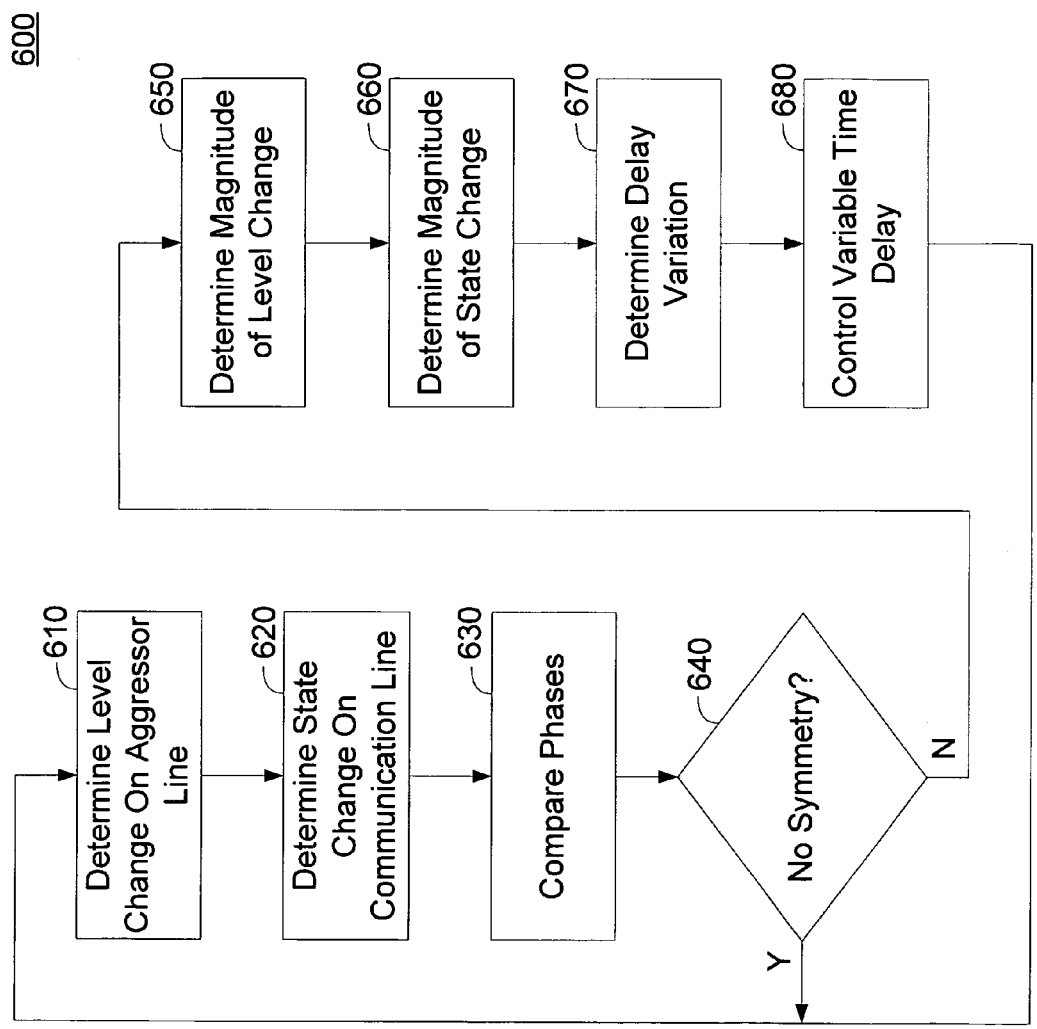
FIG. 6 is a simplified flowchart of an embodiment of a method of crosstalk jitter equalization.

FIG. 6 is a simplified flowchart of an embodiment of a method 600 of crosstalk equalization. The method 600 can be implemented, for example, by the crosstalk equalizer of FIG. 1.

The method 600 begins at block 610 where the crosstalk equalizer determines a level change on an aggressor line. The aggressor line can be any data or signal line that is configured to carry signals that are uncorrelated with the data signals on a communication line of interest, and that couples energy to the communication line. Typically, at least a portion of the aggressor line is positioned near a portion of the communication line. In a common configuration, the aggressor line is an adjacent data line on a backplane or circuit board.

The crosstalk equalizer can monitor the aggressor line for any level change, and the level change need not correspond to a state or logical transition. The crosstalk equalizer can be configured to monitor the aggressor line for a level change during a time period that is correlated to a time period of interest on the communication line. Typically, the crosstalk equalizer monitors the aggressor line at a time that is correlated to an expected data transition time for the communication line of interest. The crosstalk equalizer can, for example, monitor the aggressor line for level transitions occurring within a symbol period prior to an expected transition occurring on the communication line.

After determining whether a level transition occurred on the aggressor line, the crosstalk equalizer can proceed to block 620 and determine if a state change occurred on the communication line of interest. The crosstalk equalizer can be configured to compensate for timing jitter on the communication line affecting the state transitions, and thus may be primarily interested in monitoring the communication line of interest for state transitions. Where the communication line of interest is a binary data line, the crosstalk equalizer can be configured to determine if a logic transition occurred.

After determining if there is a state transition in the communication line, the crosstalk equalizer can proceed to block 630 and compare the phase of any level transition to the phase of a state transition, if any, occurring on the communication line. As described earlier, there are three possible phase conditions.

In a first condition, the phase or direction of the level transition on the aggressor line can be in phase with the phase of the state transition. This situation creates an even symmetry of electric fields on the two lines. A second condition can occur where the phase of the level transition is out of phase with the phase of the state transition. This second condition is an odd symmetry where the electric fields on the two lines are opposite. A third condition occurs when there is a level transition or state transition on either of the two lines and there is no transition on the opposite line. This condition is neither even nor odd symmetry, but there is coupling between the two lines.

The crosstalk equalizer then proceeds to decision block 640 to determine if the comparison indicates no symmetry. Recall from the map of FIG. 5 that no delay variation may be necessary for a no symmetry condition. Thus, if in decision block 640 the crosstalk equalizer determines that no symmetry exists, the crosstalk equalizer makes no delay changes and proceeds back to block 610 to continue to monitor the aggressor line.

Returning to decision block 640, if the crosstalk equalizer determines that either even symmetry or odd symmetry condition occurred, the crosstalk equalizer proceeds to block 650 to determine the magnitude of the level change on the aggressor line. For binary data, the magnitude of the level change is the same for all transitions. Thus, the magnitude determination step can be omitted for binary data. However, for M-ary data, such as 4-PAM, a transition can have more than one magnitude, and the magnitude of the transition can affect the amount of energy that is coupled to the communication line.

The crosstalk equalizer then proceeds to block 660 and determines the magnitude of the transition occurring one the communication line. Similar to the aggressor line, when the communication line carries binary data, there is only one magnitude associated with a transition and the step can be omitted.

The crosstalk equalizer then proceeds to block 670 and determines a delay variation to apply to a variable time delay module based on the magnitude and phase of the transitions. The crosstalk equalizer can control a variable time delay based on a predetermined map, such as the map shown in FIG. 5.

After determining the delay variation, the crosstalk equalizer proceeds to block 680 and controls a variable time delay to provide the desired time delay. In one embodiment, the crosstalk equalizer can be configured to provide a nominal control value, such as a control voltage, to a variable time delay module, and can be configured to vary the control value by an incremental amount that is determined based on the magnitude and phase of the transitions. After controlling the variable delay module, the crosstalk equalizer returns to block 610 to continue to monitor the aggressor line.

Figure 7:
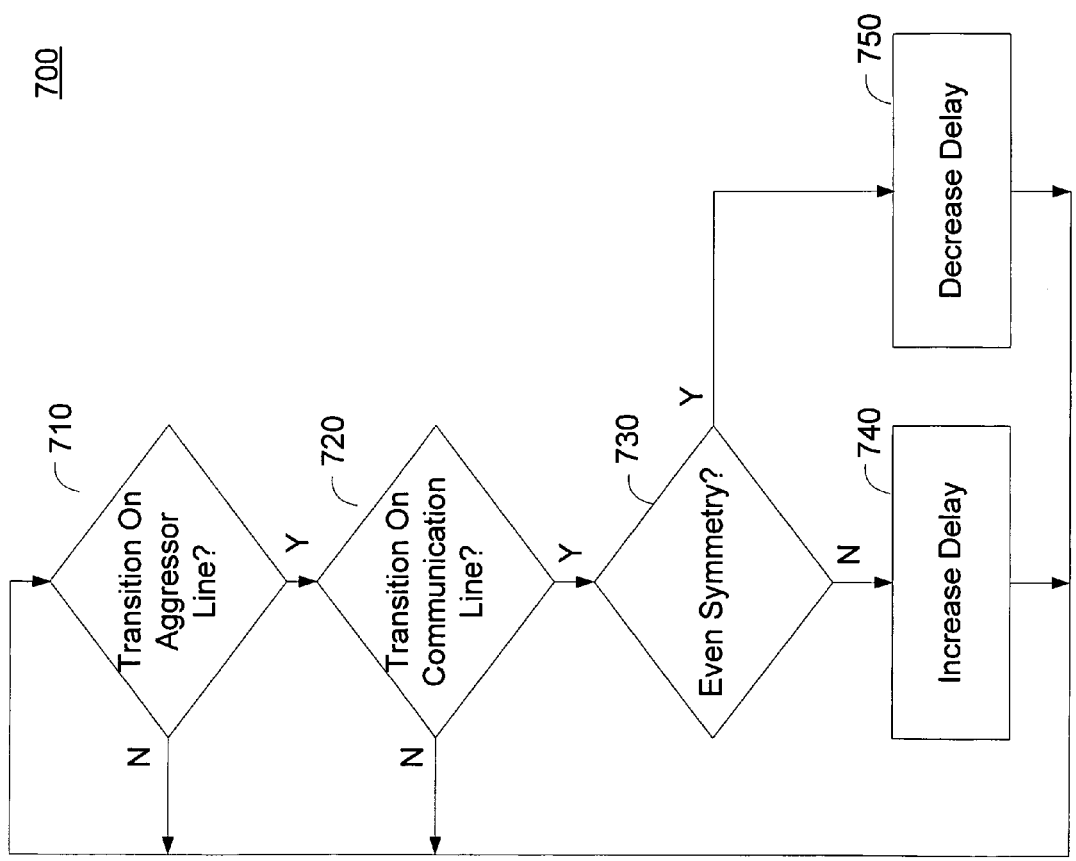
FIG. 7 is a simplified flowchart of an embodiment of a method of crosstalk jitter equalization.

FIG. 7 is a simplified flowchart of an embodiment of a method 700 of crosstalk jitter equalization, where both the aggressor line and the communication line of interest are configured to carry binary data. The method 700 can be performed, for example, by the receiver embodiment shown in FIG. 4.

The method 700 begins at decision block 710 where the receiver determines if a transition occurred on the aggressor line. If the delay map of FIG. 5 is implemented by the receiver, the amount of delay is not varied when there is no transition on the aggressor line. Thus, if the receiver determines that no transition occurred, the receiver returns to block 710 and awaits the next time increment to determine if a transition occurred on the aggressor line.

If, at decision block 710, the receiver determines a transition did occur on the aggressor line, the receiver proceeds to decision block 720 and determines if a transition occurred on the communication line. Typically, the receiver determines if a transition occurred on the communication line during the same time interval that was used to determine if a transition occurred on the aggressor line.

As was the case with the aggressor line, if the receiver determines that no transition occurred on the communication line, the amount of delay is not varied. Therefore, the receiver returns to block 710 to monitor the aggressor line and determine if a transition occurred.

If, at decision block 720, the receiver determines that a transition occurred, the receiver proceeds to decision block 730 to determine if the transitions on the aggressor and communication line have even symmetry. If so, the receiver proceeds to block 750 and decreases the delay in a variable delay module positioned in series with the communication line. The receiver can be configured, for example, to decrease the delay by a predetermined amount.

Returning to decision block 730, if the receiver determines that the transitions on the aggressor and communication line do not have even symmetry, the receiver proceeds to block 740 and increases the delay in a variable delay module positioned in series with the communication line.

After either increasing or decreasing the delay provided by the variable delay module, the receiver returns to decision block 710 to again determine if a transition occurred on the aggressor line.

Figure 8:
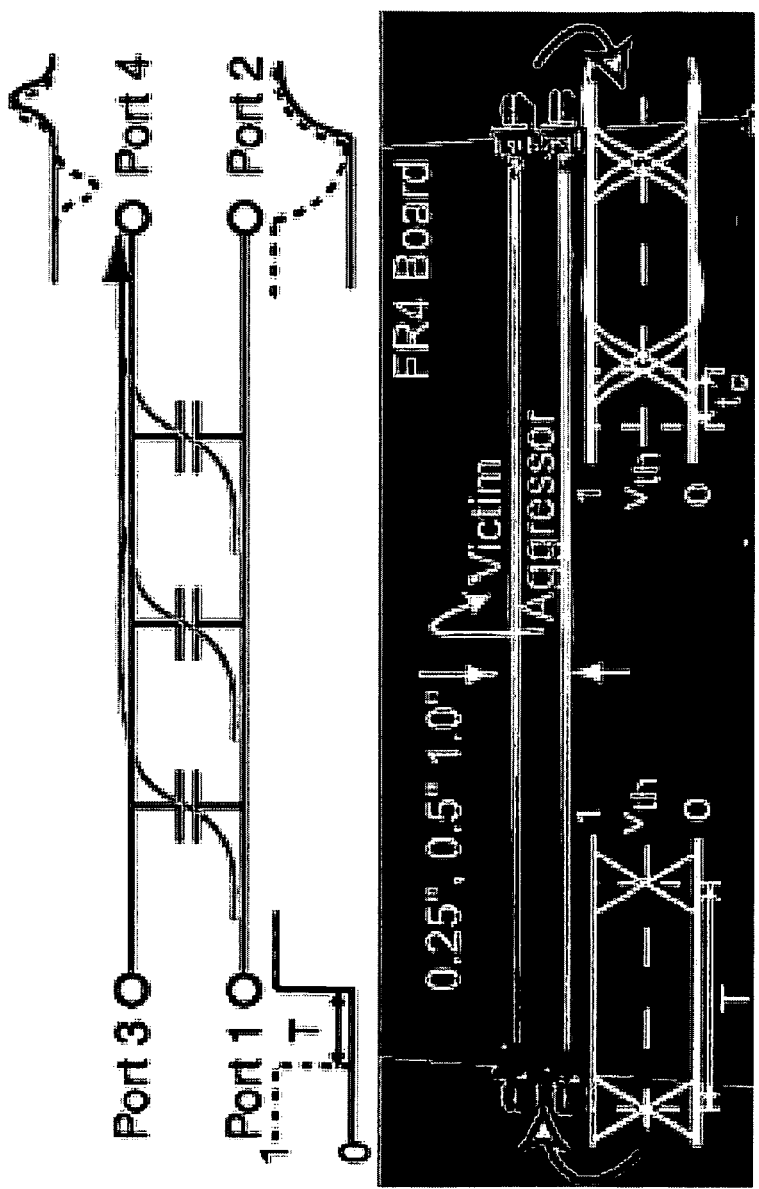
FIG. 8 is a illustration of data dependent jitter in a microstrip structure.

Jitter consists of deterministic and random components. Deterministic components include data-dependent jitter and bounded-uncorrelated jitter. First, the data-dependent jitter (DDJ) due to the transmission line is analyzed and a DDJ probability density function (PDF) is introduced. FIG. 8 illustrates the data transition ambiguity caused by the microstrip line. Second, an aggressive neighboring signal causes bounded uncorrelated jitter (BUJ) and a PDF is formulated that accounts for the coupling. These two jitter PDFs dominate jitter in interconnects. The PDFs are predicted from the step response and S-parameters and matched to measurements on an FR4 board with microstrip lines of various separation.

The properties of DDJ are determined analytically from a characterization of the transmission line. The received non-return-to-zero (NRZ) data signal is $$r(t) = \sum_{n=-\infty}^{\infty} a_n p(t - nT). \tag{1}$$

where $a_n$ is the binary value and p(t) is the pulse response with period T. The pulse response is related to the step response, s(t);

$$p(t) = s(t) - s(t-T). \tag{2}$$

Substituting (2) into (1), we have $$r(t) = \sum_{n=-\infty}^{\infty} a_n [s(t - nT) - s(t - (n+1)T)]. \tag{3}$$

A first-order Taylor series approximates the step response.

$$s(t-nT) = s(t_o - nT) + (t-t_o)s^{(1)}(t_o - nT) \tag{4}$$

The superscript denotes the derivative order and $t_o$ is the time at which s(t) crosses a voltage threshold, $v_{th}$. Substituting (4) into (3), the threshold crossing time, $t_c$, is:

$$t_c = t_o + \frac{v_{th} - \sum a_n[s(t_o - nT) - s(t_o - (n+1)T)]}{\sum a_n[s^{(1)}(t_o - nT) - s^{(1)}(t_o - (n+1)T)]}. \quad (5)$$

Jitter is the deviation of the signal from a reference such as $t_o$ (i.e., $\Delta t_c = t_c - t_o$). Clearly, $t_c$ depends on earlier bits. Therefore, $\Delta t_c$ is the DDJ. If two previous bits are considered, there are four possible sequences with transitions at the current bit: 001, 101, 110, and 010. If we assume $v_{th}=0.5$, there are two different $t_c$ for the 001 and 101 sequences as illustrated in FIG. 8. For 001 and 110 sequences, $t_c = t_o$ since, by definition, $s(t_o) = v_{th}$. For the 101 and 010 sequences, $$\Delta t_{c,DDJ} = \frac{1 - s(t_o + T)}{S^{(1)}(t_o + T) - s^{(1)}(t_o)}. \quad (6)$$

Notably, the denominator contains the slope implying that slow waveforms suffer from more DDJ. The first order DDJ is a two-valued PDF of $\Delta t_c$ as modeled in [NCITS. Fibre Channel—Methodologies for Jitter Specification—MJSQ, T11.2/Project 1316-DT/Rev. 10.0. National Committee for Information Technology Standardization, March 2003].

$$pdf_{DDJ}(\Delta t_c) = \frac{1}{2}[\delta(\Delta t_c) + \delta(\Delta t_c - \Delta t_{c,DDJ})]. \quad (7)$$

If additional bits are considered, the PDF extends to more peaks. Both victim and aggressor signals suffer from the DDJ impairment because the transmission lines are identical.

Bounded Uncorrelated Jitter

Capacitive coupling introduces energy from an aggressor to a victim signal as illustrated in FIG. 8. Inductive effects can also be considerable in certain cases. We assume capacitive coupling but inductive coupling can be treated similarly. The nature of the coupling capacitance, $C_c$, between microstrip lines has been studied (e.g. D. M. Pozar, *Microwave Engineering*, New York: J. Wiley & Sons, 1998). Even and odd modes experience $C_c$ with relative strength of zero or two. For equiprobable NRZ data, the excitations are uncorrelated and both modes occur equally. Hence, the $C_c$ has a relative strength of one. Notably, the mode-dependent capacitance ultimately disperses the signal on the microstrip line.

Although the capacitance is distributed, the coupled signal travels through the same amount of transmission line irrespective of the coupling point, as shown in FIG. 8. Therefore, the coupling between the victim and aggressor line is approximated as a lumped capacitance:

$$|S_{41}(\omega)| \approx \omega C_c Z_o / 2 \quad (8)$$

A differentiated version of the aggressor contributes to (3), $$r_{coupled}(t) = \frac{Z_o C_c}{2} \sum (b_n - b_{n-1}) s^{(1)}(t - nT) \quad (9)$$

The timing jitter resulting from the uncorrelated data sequence can now be calculated as $$\Delta t_{c,BUJ} = \frac{Z_o C_c}{2} \frac{\sum (b_n - b_{n-1}) s^{(1)}(t_o - nT)}{\sum (a_n - a_{n-1}) s^{(1)}(t_o - nT)}, \quad (10)$$

where $b_n$ is the binary value of the aggressor signal, but can be generalized to represent an M-ary value. Equation (10) features only the slope of the step response. Since a data transition occurs in the victim signal, $a_0 - a_{-1}$ is always non-zero. Under certain cases, (10) simplifies further. If the aggressor and victim are identical, $t_{c,BUJ} = -Z_o C_c/2$. However, $C_c = 0$ because the mode is even. If the aggressor is a differential signal, $a_n = -b_n$ and $t_{c,BUJ} = Z_o C_c$ since the mode is odd. Therefore, the coupling delays the signal. For two uncorrelated bits, the role of the slope cancels and there are three values for (10). Now, the PDF for the BUJ can be approximated.

$$pdf_{BUJ} = \frac{1}{4}\delta\left(\Delta t_c + \frac{Z_o C_c}{2}\right) + \frac{1}{2}\delta(\Delta t_c) + \frac{1}{4}\delta + \left(\Delta t_c \frac{Z_o C_c}{2}\right) \quad (11)$$

Convolving the PDF of the DDJ and BUJ determines the total deterministic jitter impairment of the received signal;

$$pdf_{Jitter}(\Delta t_c) = pdf_{DDJ}(\Delta t_c) \otimes pdf_{BUJ}(\Delta t_c) \quad (12)$$

Since the first-order DDJ has two terms and the BUJ has three terms, the total deterministic jitter is a PDF with at most six delta functions corresponding to jitter peaks.

Experimental Results

The FR4 board shown in FIG. 8 has 9" coupled microstrip lines separated by 0.25", 0.5", and 1". Network analysis of the lines is plotted in FIG. 9. $S_{21}$ indicates that the 3 dB bandwidth is 2.5 GHz for the 0.25" lines and 3.8 GHz for the 0.5" and 1" lines.

Figure 10:
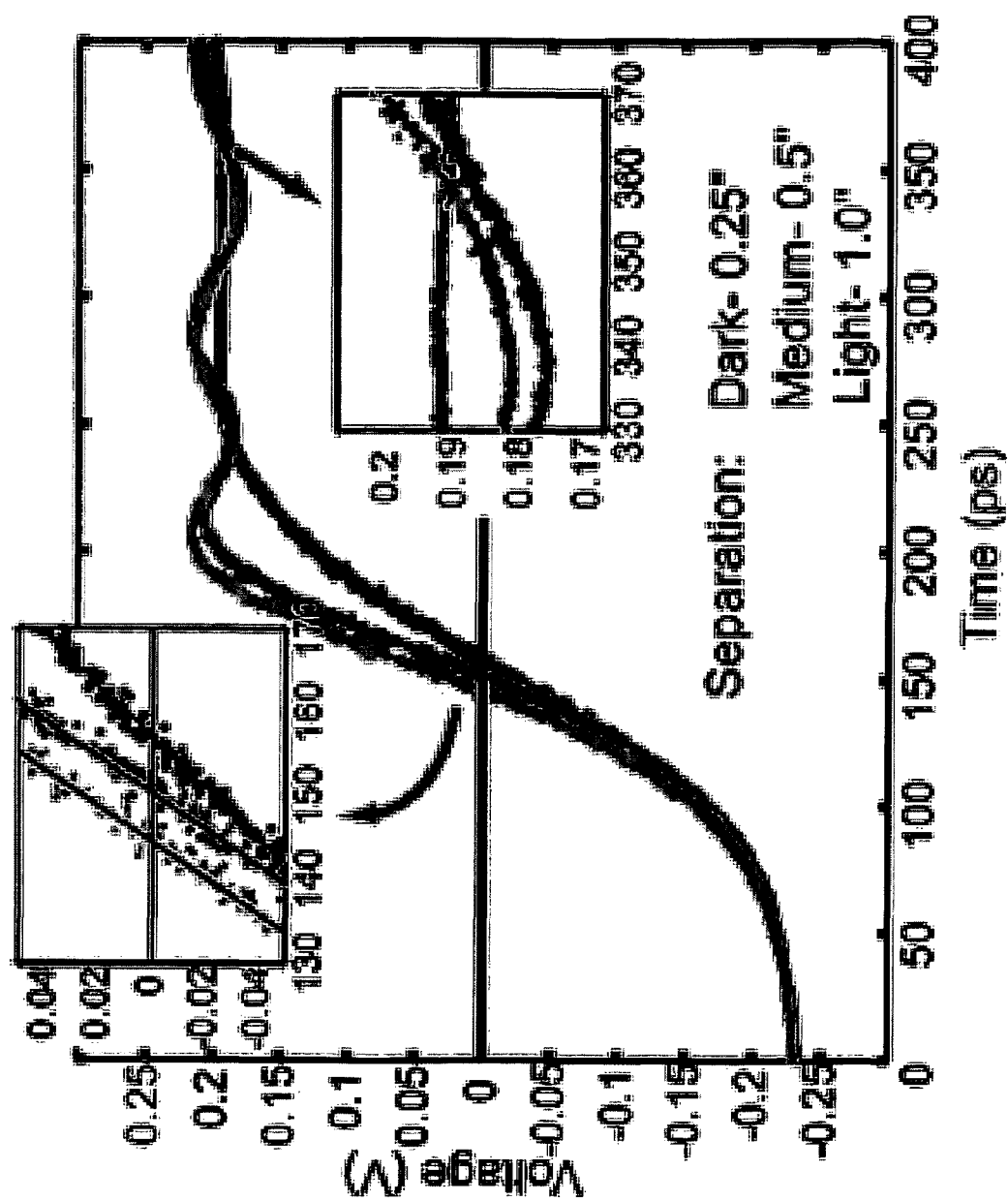
FIG. 10 is a graph of step response for different line separations.
Figure 11:
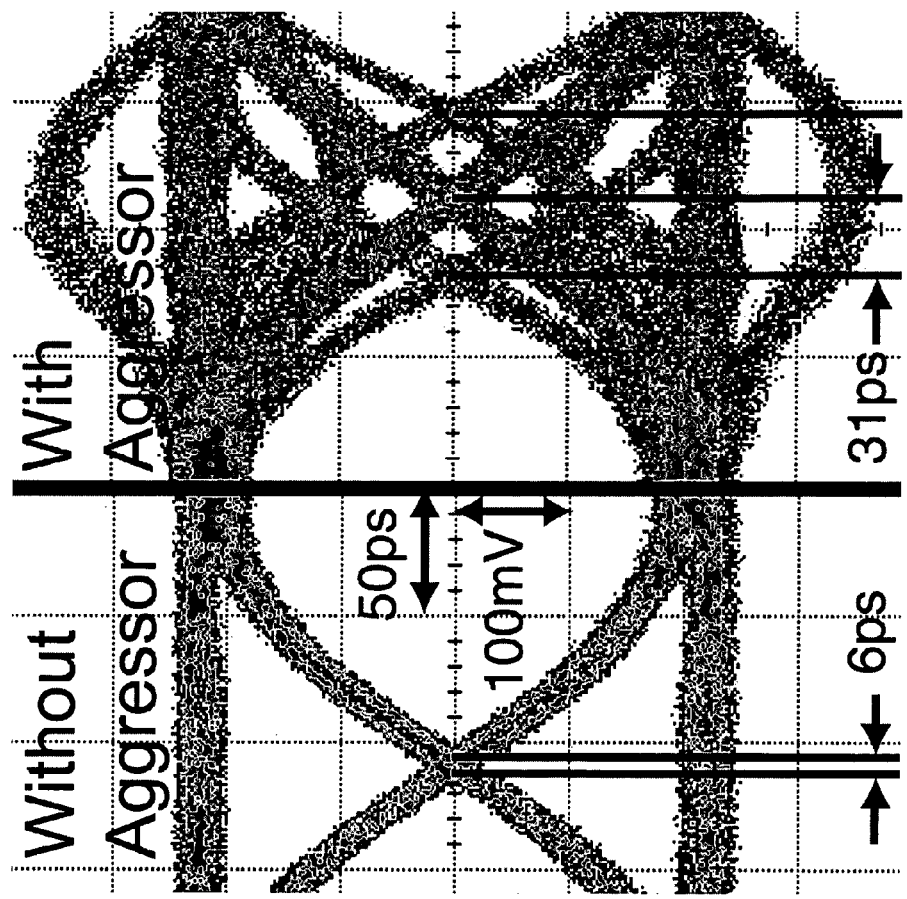
FIG. 11 is a graph of an example of an eye diagram for a victim line.
Figure 12:
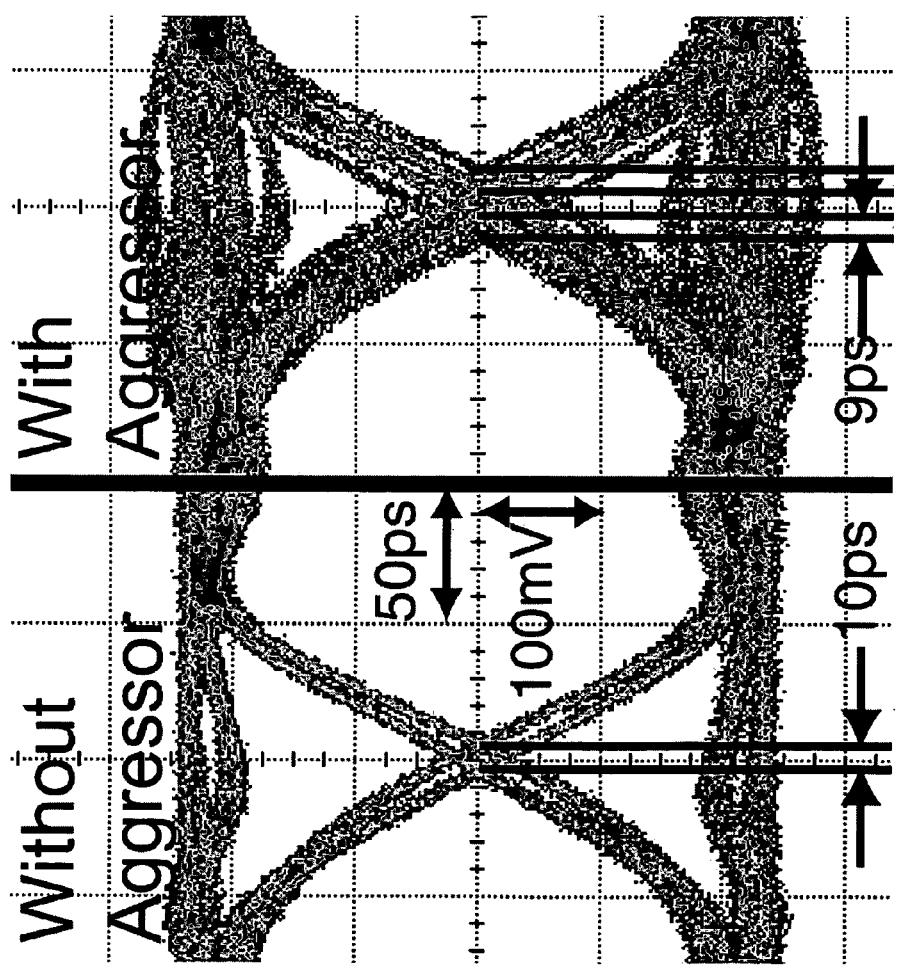
FIG. 12 is a graph of an example of an eye diagram for a victim line.
Figure 13:
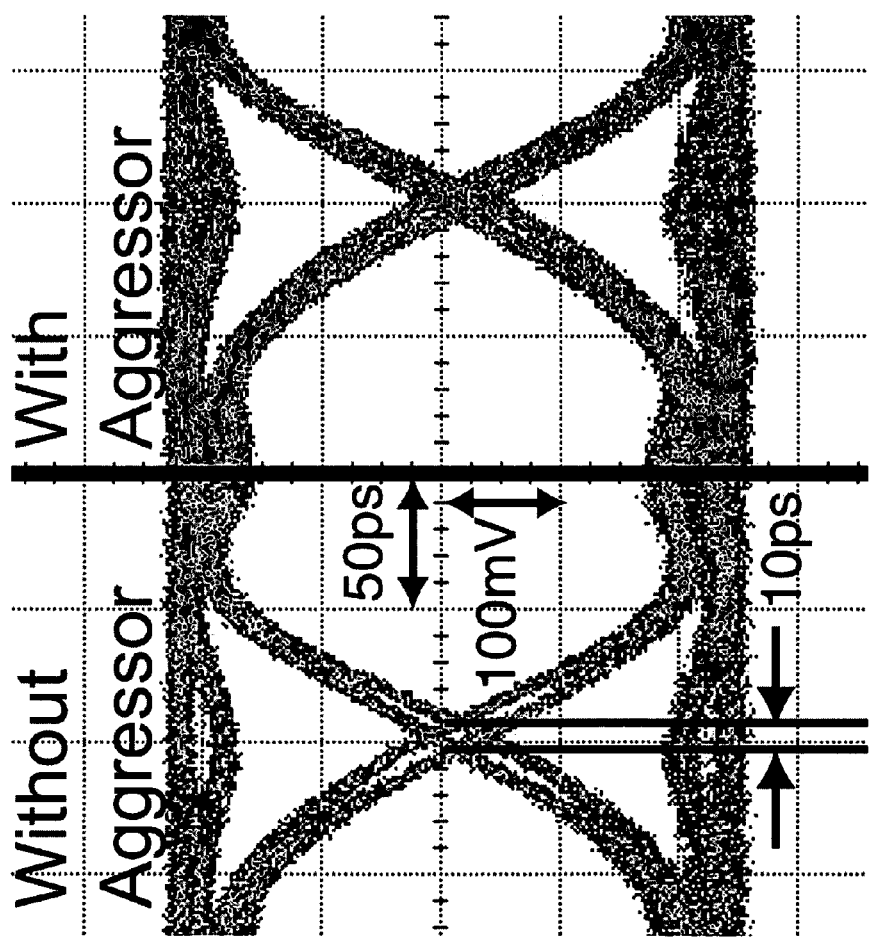
FIG. 13 is a graph of an example of an eye diagram for a victim line.

The measured step responses are plotted in FIG. 10 and are used to calculate the DDJ in Table I. The step response value is normalized to one in the table. The 0.25" lines feature a frequency null near 9 GHz and the step response is slowest. The negative value for the DDJ indicates that the 101 sequence is faster than the 001 sequence. Interestingly, while the 0.25" line response in FIG. 10 is slowest, the DDJ calculated in Table I is smallest. This emphasizes the importance of the slope after one period. FIGS. 11, 12, and 13 show the data eyes at 5 Gb/s for the 0.25", 0.5", and 1.0" lines without the impact of the aggressor signal. The DDJ values measured from these eyes are 6 ps, 10 ps, and 10 ps. The DDJ measured from the data eyes agrees with the predicted DDJ value in (6).

TABLE 1

Calculated and Measured DDJ for FR4 Coupled Microstrip

| Line | s(t + T) | $s^{(1)}(t)$ | $s^{(1)}(t + T)$ | Predicted $\Delta t_{c,DDJ}$ | Measured $\Delta t_{c,DDJ}$ | Error |
|---|---|---|---|---|---|---|
| 0.25" | 0.98 V | 3.4e9 V/s | −9.8e7 V/s | −5.1 ps | −6 ps | 15% |
| 0.5" | 0.95 V | 4.2e9 V/s | 5.7e8 V/s | −11 ps | −10 ps | 10% |
| 1" | 0.96 V | 4.5e9 V/s | 2.7e8 V/s | −8.8 ps | −10 ps | 12% |

Figure 9:
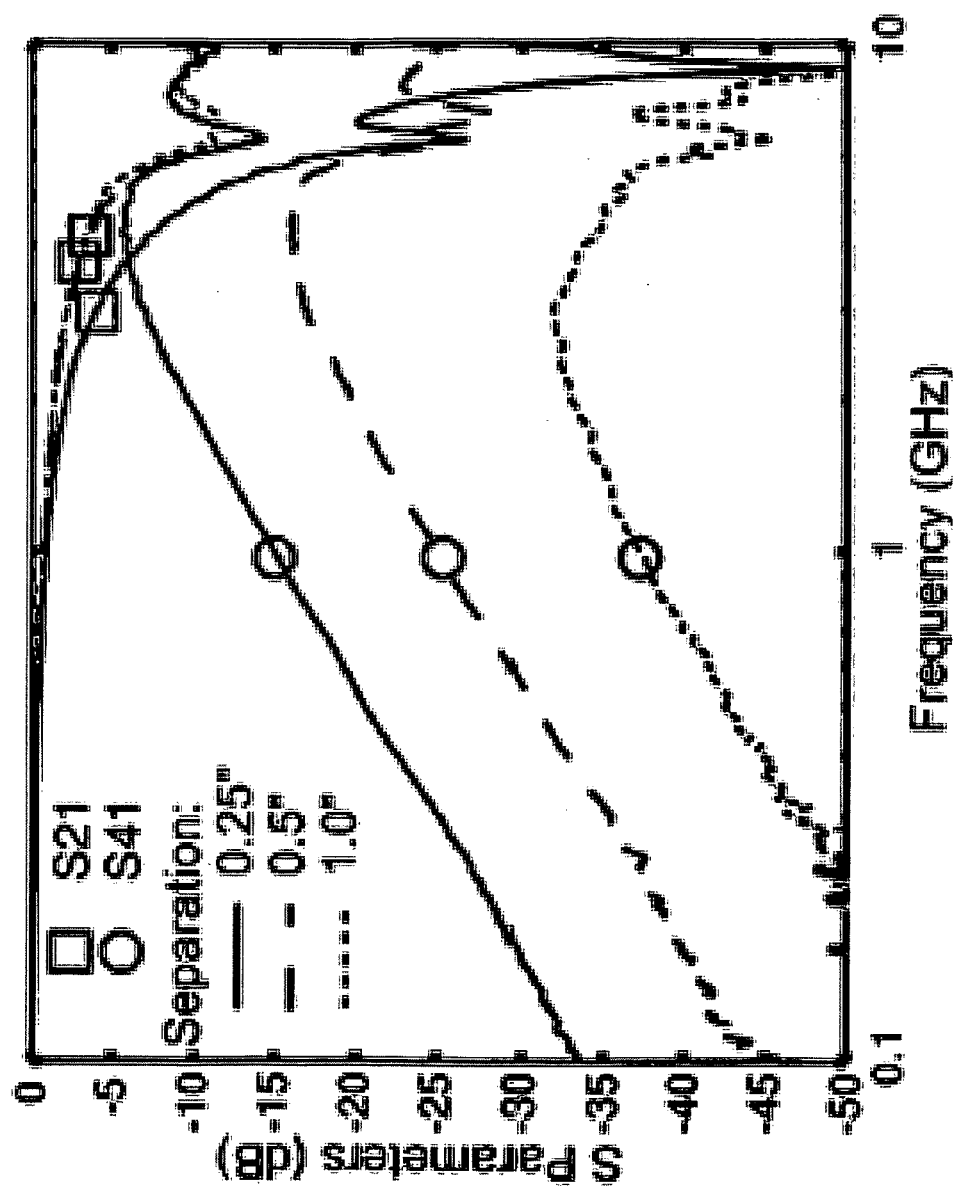
FIG. 9 is a graph of S-parameters for coupled microstrip.

In FIG. 9, $S_{41}$ shows the coupling is capacitive to 6 GHz. From ADS simulations, the coupling capacitance is 1.4 pF for the 0.25" line, 400 fF for the 0.5" line, and 120 fF for the 1.0"

line. The time constants that determine the PDF of the BUJ are therefore 35 ps, 10 ps, and 3 ps for these line separations, respectively, since the characteristic line impedance is 50Ω. The accuracy of the line impedance can have a drastic impact on the accuracy of the BUJ prediction.

Finally, the predicted values for the DDJ and the BUJ determine the location and probability of the jitter peaks given in (7) and (11) in the presence of an aggressive signal. A 5 GB/s PRBS is introduced to the victim line. The differential line is delayed by four periods and introduced to the aggressor line. For the 0.25" separation, the total deterministic jitter PDF is calculated in Table II. In this case, BUJ>DDJ. FIG. 11 exhibits a central $\Delta t_c$ consisting of the −5.1 ps and 0 ps terms. The random jitter limits the resolution of the peaks. The probability indicates that the central threshold crossing occurs twice as often as the outer threshold crossings. The increased contrast of the central threshold crossing time in FIG. 11 confirms this. The peaks are separated by 31 ps indicating that the overall error for the deterministic jitter prediction is about 11%.

For the 0.5" separation, the BUJ is comparable to the DDJ. More $\Delta t_c$ are obvious but the total range of the jitter is smaller. Again, random jitter prevents resolving the −11 ps and −10 ps crossings and the −1 ps and 0 ps crossings. Clearly, these peaks are more probable than the outer peaks in the FIG. 11 because they occur three times as often. The $\Delta t_c$ are separated by 9 ps. The predicted BUJ is 10 ps so the error is about 10%.

Finally, the 1" separation illustrates the case that the BUJ<DDJ. The BUJ obscures the distinct $\Delta t_c$ of the DDJ and behaves like random jitter. As a result, verifying the predicted $\Delta t_c$ for the total deterministic jitter is difficult.

TABLE II

Predicted Location and Probability of Deterministic Jitter Peaks

| Line | $\Delta t_{c,DDJ}$ | $\Delta t_{c,BUJ}$ | $\Delta t_{c,DDJ\oplus BUJ}$ |
|---|---|---|---|
| 0.25" | −5.1 ps | 35 ps | −40 ps (Pr = 1/8), −35 ps (Pr = 1/8), −5.1 ps (Pr = 1/4), 0 ps (Pr = 1/4), 30 ps (Pr = 1/8), 35 ps (Pr = 1/8) |
| 0.5" | −11 ps | 10 ps | −21 ps (Pr = 1/8), −11 ps (Pr = 1/4), −1 ps (Pr = 1/8), −10 ps (Pr = 1/8), 0 ps (Pr = 1/4), 10 ps (Pr = 1/8) |
| 1.0" | −8.7 ps | 3 ps | −12 ps (Pr = 1/8), −8.7 ps (Pr = 1/4), −5.7 ps (Pr = 1/8), −3 ps (Pr = 1/8), 0 ps (Pr = 1/4), 3 ps (Pr = 1/8) |

The analysis of the DDJ in a coupled microstrip environment emphasized the role of the step response slope in determining the DDJ impairment. The BUJ analysis stressed the coupling capacitance in determining the BUJ impairment. Depending on the proximity of the neighboring lines, the timing margins of the data eye, which determines the quality of the digital link, is reduced. Predicted values for the data-dependent and bound uncorrelated jitter were calculated from the step response and S-parameter measurement of microstrip traces on an FR4 board. The observed data eyes agree to within 15% of the predicted DDJ and to 11% of the predicted BUJ. This gives a reasonable design rule for managing jitter degradation resulting from capacitive coupling.

Methods, apparatus, and systems for crosstalk jitter equalization are disclosed. The jitter equalizer can determine if one or more transitions occurred on a neighboring line and compensate for crosstalk jitter based on the determination. The crosstalk jitter equalizer can compensate for the jitter by varying a delay positioned in series with serial data. The amount of delay variation can depend on a phase or symmetry between the data on the communication line of interest and the data on the neighboring line.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of equalizing crosstalk jitter, the method comprising:
    determining a level transition in a neighboring signal;
    determining a state transition in a communication signal;
    comparing the level transition in the neighboring signal to the state transition in the communication signal; and
    modifying a timing of the communication signal based at least in part on the comparison,
    wherein modifying the timing of the communication signal comprises decreasing a duration of a time delay in a signal path of the communication signal if the level transition and state transition have even symmetry.

2. The method of claim 1, wherein determining the level transition in the neighboring signal comprises determining the level transition during a predetermined time period.

3. The method of claim 2, wherein determining the state transition in the communication signal comprises determining the state transition during the predetermined time period.

4. The method of claim 1, wherein determining the level transition in the neighboring signal comprises determining a logic transition during a predetermined time period.

5. A method of equalizing crosstalk jitter, the method comprising:
    determining a level transition in a neighboring signal;
    determining a state transition in a communication signal;
    comparing the level transition in the neighboring signal to the state transition in the communication signal; and
    modifying a timing of the communication signal based at least in part on the comparison,
    wherein comparing the level transition in the neighboring signal to the state transition in the communication signal comprises
        comparing a phase of the level transition relative to the state transition; and
        comparing a magnitude of the level transition relative to the state transition.

6. The method of claim 1, wherein modifying the timing of the communication signal comprises varying a duration of a time delay operating on the communication signal.

7. The method of claim 5, wherein modifying the timing of the communication signal comprises decreasing a duration of a time delay in a signal path of the communication signal if the level transition and state transition have even symmetry.

8. The method of claim 1, wherein modifying the timing of the communication signal comprises increasing a duration of a time delay in a signal path of the communication signal if the level transition and state transition have odd symmetry.

9. A method of equalizing crosstalk jitter, the method comprising:
- determining a logic transition in a neighboring conductive interconnect carrying data signals operating at a rate greater than approximately 6 Giga-symbols per second;
- determining a logic transition on a communication line carrying data signals operating at a rate substantially equal to the rate of the neighboring conductive interconnect;
- comparing a phase of the logic transition on the neighboring conductive interconnect to a phase of the logic transition on the communication line;
- varying a time delay applied to the data signals of the communication line based at least in part on the comparison;
- determining a logic transition in an additional neighboring conductive interconnect;
- comparing a phase of the logic transition on the additional neighboring conductive interconnect to the phase of the logic transition on the communication line; and
- wherein varying the time delay comprises varying the time delay based in part on the comparison of the phase of the logic transition of the additional neighboring conductive interconnect to the phase of the logic transition on the communication line.

10. The method of claim 9, wherein the neighboring conductive interconnect and the communication line comprise conductive traces on a backplane.

11. The method of claim 9, wherein the logic transition in the neighboring conductive interconnect comprises a binary logic transition.

12. The method of claim 9, wherein the logic transition in the neighboring conductive interconnect comprises an M-ary logic transition.

13. An apparatus configured to equalize crosstalk jitter, the apparatus comprising:
- a first transition detector configured to determine a level transition on a neighboring interconnect and provide an output based on the level transition;
- a second transition detector configured to determine a state transition on a communication line and provide an output based on the state transition;
- a multiplier coupled to the first transition detector and the second transition detector and configured to generate a control signal based in part on the output from the first transition detector and the output of the second transition detector;
- a variable delay module coupled in series with a signal path of the communication line and configured to delay a signal on the communication line based in part on the control signal; and
- a fixed delay module coupled in series with a signal path on the neighboring interconnect and wherein the first transition detector comprises a first input at an input to the fixed delay module and a second input at an output of the fixed delay module.

14. An apparatus configured to equalize crosstalk jitter, the apparatus comprising:
- a first transition detector configured to determine a level transition on a neighboring interconnect and provide an output based on the level transition;
- a second transition detector configured to determine a state transition on a communication line and provide an output based on the state transition;
- a multiplier coupled to the first transition detector and the second transition detector and configured to generate a control signal based in part on the output from the first transition detector and the output of the second transition detector;
- a variable delay module coupled in series with a signal path of the communication line and configured to delay a signal on the communication line based in part on the control signal; and
- a fixed delay module coupled in series with the signal path of the communication line and positioned prior to the variable delay module, and wherein the second transition detector is configured to determine the state transition by comparing an input signal of the fixed delay module to an output signal of the fixed delay module.

15. An apparatus configured to equalize crosstalk jitter, the apparatus comprising:
- a first transition detector configured to determine a level transition on a neighboring interconnect and provide an output based on the level transition;
- a second transition detector configured to determine a state transition on a communication line and provide an output based on the state transition;
- a multiplier coupled to the first transition detector and the second transition detector and configured to generate a control signal based in part on the output from the first transition detector and the output of the second transition detector;
- a variable delay module coupled in series with a signal path of the communication line and configured to delay a signal on the communication line based in part on the control signal; and
- wherein the variable delay module is configured to provide a delay that is less than a nominal delay duration when the level transition and the state transition exhibit even symmetry.

16. An apparatus configured to equalize crosstalk jitter, the apparatus comprising:
- a first transition detector configured to determine a level transition on a neighboring interconnect and provide an output based on the level transition;
- a second transition detector configured to determine a state transition on a communication line and provide an output based on the state transition;
- a multiplier coupled to the first transition detector and the second transition detector and configured to generate a control signal based in part on the output from the first transition detector and the output of the second transition detector;
- a variable delay module coupled in series with a signal path of the communication line and configured to delay a signal on the communication line based in part on the control signal; and
- wherein the variable delay module is configured to provide a delay that is greater than a nominal delay duration when the level transition and the state transition exhibit odd symmetry.

17. The apparatus of claim 13, wherein at least one of the level transition and the state transition comprises a binary logic transition.

18. The apparatus of claim 13, wherein at least one of the level transition and the state transition comprises an M-ary logic transition.

* * * * *